United States Patent
Blair et al.

(10) Patent No.: US 8,600,794 B2
(45) Date of Patent: Dec. 3, 2013

(54) MEETING NOTIFICATION AND MERGING AGENTS

(75) Inventors: Colin Blair, Westleigh (AU); Paul Roller Michaelis, Louisville, CO (US); James K. Wan, Carlingford (AU)

(73) Assignee: Avaya Inc., Basking Ridge, NJ (US)

( * ) Notice: Subject to any disclaimer, the term of this patent is extended or adjusted under 35 U.S.C. 154(b) by 1197 days.

(21) Appl. No.: 11/396,175

(22) Filed: Jun. 16, 2006

(65) Prior Publication Data
US 2007/0265903 A1    Nov. 15, 2007

Related U.S. Application Data

(60) Provisional application No. 60/799,223, filed on May 10, 2006.

(51) Int. Cl.
*G06Q 10/00*    (2012.01)

(52) U.S. Cl.
USPC .......................................... 705/7.18; 705/7.19

(58) Field of Classification Search
USPC .................... 705/7.11, 7.16, 7.18, 7.19, 7.24; 715/963; 718/102, 103; 707/951; 708/112; 702/178
See application file for complete search history.

(56) References Cited

U.S. PATENT DOCUMENTS

| | | | |
|---|---|---|---|
| 4,819,191 A | 4/1989 | Scully et al. | |
| 4,831,552 A * | 5/1989 | Scully et al. | 715/751 |
| 5,050,077 A | 9/1991 | Vincent | |
| 5,124,912 A | 6/1992 | Hotaling et al. | |
| 5,195,086 A * | 3/1993 | Baumgartner et al. | 370/264 |
| 5,197,000 A | 3/1993 | Vincent | |
| 5,206,903 A | 4/1993 | Kohler et al. | |
| 5,216,603 A | 6/1993 | Flores et al. | |
| 5,323,314 A | 6/1994 | Baber et al. | |
| 5,428,784 A | 6/1995 | Cahill, Jr. | |
| 5,555,346 A | 9/1996 | Gross et al. | |
| 5,619,555 A | 4/1997 | Fenton et al. | |
| 5,627,978 A | 5/1997 | Altom et al. | |
| 5,774,867 A | 6/1998 | Fitzpatrick et al. | |
| 5,793,365 A | 8/1998 | Tang et al. | |
| 5,813,013 A | 9/1998 | Shakib et al. | |
| 5,828,747 A | 10/1998 | Fisher et al. | |
| 5,889,945 A | 3/1999 | Porter et al. | |
| 5,893,073 A | 4/1999 | Kasso et al. | |
| 5,905,793 A | 5/1999 | Flockhart et al. | |
| 5,920,701 A * | 7/1999 | Miller et al. | 709/228 |
| 5,960,406 A | 9/1999 | Rasansky et al. | |

(Continued)

FOREIGN PATENT DOCUMENTS

| | | |
|---|---|---|
| EP | 1014286 | 6/2000 |
| EP | 1 560 138 | 8/2005 |
| WO | WO 2005/010715 | 2/2005 |

OTHER PUBLICATIONS http://en.wikipedia.org/wiki/Microsoft_Outlook; printed Mar. 14, 2006; 4 pages.

(Continued)

*Primary Examiner* — Jonathan G Sterrett
*Assistant Examiner* — Stephanie Delich
(74) *Attorney, Agent, or Firm* — Sheridan Ross P.C.

(57) ABSTRACT

The present invention is directed generally to an information manager that identifies currently scheduled meetings satisfying selected search parameters, discloses, when permitted, details of the identified meetings to requestors, and merges requested and existing meetings when appropriate.

18 Claims, 6 Drawing Sheets

(56) References Cited

U.S. PATENT DOCUMENTS

| | | | |
|---|---|---|---|
| 5,963,913 A | 10/1999 | Henneuse et al. | |
| 5,982,873 A | 11/1999 | Flockhart et al. | |
| 6,064,976 A * | 5/2000 | Tolopka | 705/9 |
| 6,085,166 A | 7/2000 | Beckhardt et al. | |
| 6,101,480 A * | 8/2000 | Conmy et al. | 705/9 |
| 6,147,685 A | 11/2000 | Bliss et al. | |
| 6,163,607 A | 12/2000 | Bogart et al. | |
| 6,173,053 B1 | 1/2001 | Bogart et al. | |
| 6,192,111 B1 | 2/2001 | Wu | |
| 6,192,122 B1 | 2/2001 | Flockhart et al. | |
| 6,272,074 B1 | 8/2001 | Winner | |
| 6,360,217 B1 | 3/2002 | Gopal et al. | |
| 6,363,352 B1 | 3/2002 | Dailey et al. | |
| 6,377,965 B1 | 4/2002 | Hachamovitch et al. | |
| 6,434,571 B1 | 8/2002 | Nolte | |
| 6,570,555 B1 | 5/2003 | Prevost et al. | |
| 6,594,637 B1 | 7/2003 | Furukawa et al. | |
| 6,640,230 B1 | 10/2003 | Alexander et al. | |
| 6,662,309 B2 | 12/2003 | Ando et al. | |
| 6,675,356 B1 | 1/2004 | Adler et al. | |
| 6,694,335 B1 | 2/2004 | Hopmann et al. | |
| 6,731,323 B2 | 5/2004 | Doss et al. | |
| 6,988,128 B1 | 1/2006 | Alexander et al. | |
| 7,007,235 B1 | 2/2006 | Hussein et al. | |
| 7,016,909 B2 | 3/2006 | Chan et al. | |
| 7,027,995 B2 | 4/2006 | Kaufman et al. | |
| 7,035,865 B2 | 4/2006 | Doss et al. | |
| 7,082,402 B2 | 7/2006 | Conmy et al. | |
| 7,113,797 B2 | 9/2006 | Kelley et al. | |
| 7,130,885 B2 | 10/2006 | Chandra et al. | |
| 7,149,810 B1 | 12/2006 | Miller et al. | |
| 7,155,435 B1 | 12/2006 | Day et al. | |
| 7,187,384 B2 | 3/2007 | Noyle | |
| 7,188,073 B1 | 3/2007 | Tam et al. | |
| 7,254,569 B2 | 8/2007 | Goodman et al. | |
| 7,334,000 B2 | 2/2008 | Chhatrapati et al. | |
| 7,343,312 B2 | 3/2008 | Capek et al. | |
| 7,343,313 B2 | 3/2008 | Dorenbosch et al. | |
| 7,353,466 B2 | 4/2008 | Crane et al. | |
| 7,363,590 B2 | 4/2008 | Kerr et al. | |
| 7,383,291 B2 | 6/2008 | Guiheneuf et al. | |
| 7,383,303 B1 | 6/2008 | Bort | |
| 7,395,221 B2 | 7/2008 | Doss et al. | |
| 7,436,654 B2 | 10/2008 | Cho | |
| 7,440,961 B1 | 10/2008 | Matousek | |
| 7,519,672 B2 * | 4/2009 | Boss et al. | 709/206 |
| 7,595,717 B2 | 9/2009 | Boss et al. | |
| 7,693,734 B2 | 4/2010 | Christenson et al. | |
| 2001/0054072 A1 | 12/2001 | Discolo et al. | |
| 2002/0085701 A1 | 7/2002 | Parsons et al. | |
| 2002/0117847 A1 | 8/2002 | Ede et al. | |
| 2002/0120600 A1 | 8/2002 | Schiavone et al. | |
| 2002/0144136 A1* | 10/2002 | Stornetta et al. | 713/200 |
| 2003/0046304 A1 | 3/2003 | Peskin et al. | |
| 2003/0069880 A1 | 4/2003 | Harrison et al. | |
| 2003/0149606 A1* | 8/2003 | Cragun et al. | 705/8 |
| 2003/0154293 A1 | 8/2003 | Zmolek | |
| 2003/0163537 A1 | 8/2003 | Rohall et al. | |
| 2004/0054726 A1 | 3/2004 | Doss et al. | |
| 2004/0128181 A1 | 7/2004 | Zurko et al. | |
| 2004/0168133 A1 | 8/2004 | Wynn et al. | |
| 2004/0192857 A1 | 9/2004 | Borer et al. | |
| 2004/0199663 A1 | 10/2004 | Horvitz et al. | |
| 2004/0254998 A1 | 12/2004 | Horvitz | |
| 2005/0069099 A1 | 3/2005 | Kozdon et al. | |
| 2005/0125246 A1 | 6/2005 | Muller et al. | |
| 2005/0165631 A1 | 7/2005 | Horvitz | |
| 2005/0171818 A1 | 8/2005 | McLaughlin | |
| 2005/0192857 A1 | 9/2005 | Levine | |
| 2005/0198144 A1 | 9/2005 | Kraenzel et al. | |
| 2006/0004843 A1 | 1/2006 | Tafoya et al. | |
| 2006/0020889 A1 | 1/2006 | Coppinger et al. | |
| 2006/0031326 A1 | 2/2006 | Ovenden | |
| 2006/0031470 A1 | 2/2006 | Chen et al. | |
| 2006/0047557 A1* | 3/2006 | Bieselin et al. | 705/9 |
| 2006/0069686 A1 | 3/2006 | Beyda et al. | |
| 2006/0184584 A1 | 8/2006 | Dunn et al. | |
| 2006/0190485 A1 | 8/2006 | Adams et al. | |
| 2006/0212330 A1 | 9/2006 | Savilampi | |
| 2006/0242109 A1 | 10/2006 | Pereira et al. | |
| 2007/0016878 A1 | 1/2007 | Forlenza et al. | |
| 2007/0118415 A1 | 5/2007 | Chen et al. | |
| 2007/0174104 A1 | 7/2007 | O'Sullivan et al. | |
| 2008/0005685 A1 | 1/2008 | Drews et al. | |
| 2008/0034425 A1 | 2/2008 | Overcash et al. | |
| 2008/0037733 A1 | 2/2008 | Chen et al. | |

OTHER PUBLICATIONS http://www.bcentral.co.uk/products/microsoft-outlook.mspx; printed Mar. 14, 2006; 2 pages.

Chapters 4, 5 and 7 from Microsoft® Office Outlook® 2003; "Step by Step"; Online Training Solutions, Inc.

Step-By-Step Manual, Microsoft Outlook, Online Training Solutions, Inc. (2004).

http://www.effectivemeetings.com (SMART Technologies, Inc., May 2003).

"Avaya™ Unified Communication Center (UCC) Speech Access Solution", Avaya, Inc. (2002), 4 pages.

"Avaya by Example; Three-Week Wonder: Avaya Unified Communication Center Speech Access Gives Road Warriors 15 Additional Days Each Year", Avaya, Inc. (2005) 3 pages.

Arthur M. Rosenberg and David A. Zimmer, "Migrating to Enterprise-Wide Communications: The Branch Office Dilemma", May 2003, 14 pages.

Arthur M. Rosenberg and David A. Zimmer, "Beyond VoIP: Enterprise Perspectives on Migrating to Multi-Modal Communications and Wireless Mobility", (Oct. 2004) 38 pages.

AIM Presence Services, http://developer.aim.com/presenceMain.jsp (2006) 2 pages.

AIM Bots, http://developer.aim.com/botMain.jsp (2006) 2 pages.

AIM Buddy Info, http://buddyinfo.aim.com/ (2006) 2 pages.

Ivtta Turin 98, "The Linguistic Components of the Reward Dialogue Creation Environment and Run Time System", http://cpk.auc.dk/~tb/articles/ivtta98.htm (Sep. 1998) 13 pages.

Rob Kassel, "How Speech Recognition Works", http://www.microsoft.com/speech/docs/How_Speech_Works_Article.htm (Nov. 30, 2004) 4 pages.

"How to Use a TTY", NETAC Teacher Tipsheet, htt://72.14.203.104/search?q=cache:JdktLkxPgMUJ:www.netac.rit.edu/downloads/TPSHT_TTY.pdf+%22teletypewriter%22+. . . (1999) 4 pages.

"TTY Brochure Feb. 2006", http://72.14.203.104/search?q=cache:O3tW0eQtbTEF: ods.utk.edu/brochures/TTYBrochureFebruary2006.pdf+%22teletypewrite . . . (Feb. 2006) 3 pages.

Tony Vitale, "Hardware and Software Aspects of a Speech Synthesizer Developed for Persons With Disabilities", http://codi.buffalo.edu/archives/computing/.dec.speech (1993).

Dave Anderson and George McNeill, "Artificial Neural Networks Technology", http://www.dacs.dtic.mil/techs/dacs_reports/text/neural_nets.txt (Aug. 20, 1992) 145 pages.

U.S. Appl. No. 10/770,640, filed Feb. 2, 2004, Mohler

U.S. Appl. No. 11/350,050, filed Feb. 7, 2006, Atkins et al.

U.S. Appl. No. 11/488,487, filed Jul. 17, 2006, Daily et al.

U.S. Appl. No. 11/554,442, filed Oct. 30, 2006, Atkins et al.

U.S. Appl. No. 11/554,478, filed Oct. 30, 2006, Atkins et al.

U.S. Appl. No. 11/554,497, filed Oct. 30, 2006, Chu et al.

U.S. Appl. No. 11/619,145, filed Jan. 2, 2007, Atkins et al.

U.S. Appl. No. 11/669,707, filed Jan. 31, 2007, Blair et al.

"Meetings in America", MCI Conferencing, available at http://e-meetings.mci.com/meetingsinamerica/uswhitepaper.php3, website updated Aug. 19, 2003, pp. 1-12.

"WebAccess Client User Guide" Novell GroupWise 6.5, Oct. 31, 2005, 68 pages.

AIM Acronym Dictionary, http://www.aim.com/acronyms.adp (Jan. 16, 2007) 7 pages.

Boyce, "Microsoft Office Outlook 2003 Inside Out," Nov. 5, 2003, Microsoft Press, Chapters 1, 19, 20.

(56) References Cited

OTHER PUBLICATIONS

Dey et al., CybreMinder: A Context-Aware System for Supporting Reminders, Handheld and Ubiquitous Computing: Second International Symposium, HUC 2000, Bristol, UK, Sep. 2000. Proceedings, Jul. 31, 2003, 15 pages, vol. 1927/2000, Springer Berlin/Heidelberg.
"FreeBusy—Microsoft Outlook email autoresponder" http://freebusy.4team.biz/; printed May 24, 2006; 4 pages.
Yin "[Design] linking and grouping items", available at http://lists.osafoundation.org/pipermail/design/2005-August/003159.html Aug. 1, 2005, pp. 1-2.
Background of the Invention for the above-captioned application (previously provided).
Avaya Case Study (Advertising Agency Uses Avaya Unified Messenger to Streamline Communications, 2003 Avaya Inc.), 2 pages.
Avaya Press Release (Avaya Introduces IBM Lotus Domino Version of Its Market-Leading Unified Messaging Software, http://www.avaya.com/usa/Error404.aspx?currentpath=master-usa/en-us/corporate/pressroom/pressreleases/2003/pr-03,Jan. 27, 2003), 4 pages.
Avaya Unified Messenger Client User Guide (2002 Avaya Inc.) Avaya Web Pages (Retrieved Archive.org from Jun. 13, 2004), 167 pages.
Avaya Unified Messenger Solution—Microsoft Exange 2000 version Installation Guide (2002 Avaya Inc.) 164 pages.
U.S. Appl. No. 12/570,933, filed Sep. 30, 2009, Chen et al.
Avaya Unified Messenger Solution—Microsoft Exange Version, 2000 version (2002 Avaya Inc), 8 pages.
"Products: Groove Virtual Office," groove.com, 2005, retrieved Mar. 11, 2011, http://replay.waybackmachine.org/2005041 901 0213/http://www.groove.netiindex.cfm/pagenamelVirtualOffice/, 2 pages.
"Competitive analysis of collaboration tools," http://www.hcii.cmu.edu/M-HCI/2004/sun/competition.htm, 2004, retrived Mar. 11, 2011, 6 pages.
Boyce, "Microsoft Office Outlook 2003 Inside Out," Nov. 5, 2003, Microsoft Press, Chapter 2.
Raider, "Make Address Book Smart Groups auto-complete in mail," MacOsHints.com, contributed Jun. 29, 2005, pp. 1-4.
Avantgo: AvantGo launches new release of Pylon products; AvantGo Pylon 5.1 offers new support for Domino 6, Palm OS 5 and custom repeating meetings M2 Presswire. Coventry: Jan. 24, 2003. p. 1-4.
"Special Edition Using Lotus Notes and Domino 5" (Published by Que, Aug. 23, 1999, ISBN 0-7897-1814-6.
"Windows Client User Guide" (Novell Groupwise 7.0, Mar. 14, 2008, copyright 2005-2008) discloses Groupwise 7.0 (released Aug. 15, 2005), 389 pages.
Clayton, Brad "Microsoft Outlook 2003 Enhancements", modified Apr. 19, 2004, Purdue University, 4 pages.

\* cited by examiner

Meeting Notification Request

[Send] [Exit] [Help]

Search for:
Desired Participants: [__________] 504a
Undesired Participants: [__________] 504b
Time Period of Interest: [504c] [504d] to [504e] [504f]
Subject Matter: [__________] 504g
Other Information: [__________] 504h Your Request:

Additional Participants: [__________] 508a
Meeting Time Requested: [__________] 508b
Subject Matter: [__________] 508c
Other Information: [__________] 508d

MEETING NOTIFICATION AND MERGING AGENTS

CROSS REFERENCE TO RELATED APPLICATION

The present application claims the benefits under 35 U.S.C. §119(e) of U.S. Provisional Application Ser. No. 60/799,223, of the same title, filed May 10, 2006, to Blair, Michaelis and Wan, which is incorporated herein by reference in its entirety.

FIELD OF THE INVENTION

The invention relates generally to enterprise scheduling applications and particularly to calendaring applications.

BACKGROUND OF THE INVENTION

Personal information managers, such as Microsoft Outlook™, provide calendar, task, and contact management, note taking, journal ability, and e-mail service. It can be used as a stand-alone application but can also operate in conjunction with Microsoft Exchange Server™ to provide enhanced functions for multiple users in an organization, such as shared mailboxes and calendars, public folders, and meeting time allocation.

Personal information managers commonly include a calendar organizer allowing a person to schedule meetings with multiple people. The manager sends out invitations and invitation updates and allows the person to book enterprise resources, such as meeting rooms, projectors, and the like.

Personal information managers generally have a number of drawbacks. First, managers do not identify existing and/or requested meetings for possible merger. This can be particularly important for organizing meetings with multiple "popular" people. People, such as company directors, team leaders, sales people, and people involved in public relations, are often difficult to get in a meeting together, commonly because they are already booked in other meetings. Second, to protect the owner's privacy and prevent breach of security, managers generally indicate only that a subscriber is "busy" or "available" without indicating what he or she is doing. Third, managers can be poor in permitting users to get added to existing meetings. A user seeking to set up meetings with an individual is notified that they are unavailable without an indication of why or for how long. It is entirely possible that the desired cluster of people already have a confidential meeting scheduled to which the user could be added.

SUMMARY OF THE INVENTION

These and other needs are addressed by the various embodiments and configurations of the present invention. The present invention is directed generally to providing meeting notifications and/or enabling meeting mergers.

In a first embodiment of the present invention, a method is provided that includes the steps of:
(a) receiving a request from a requestor to participate in a meeting with a specific participant and/or regarding a selected matter;
(b) determining whether a meeting is currently scheduled for at least some of the participants and/or for the selected matter; and
(c) when such a meeting is currently scheduled, performing at least one of the following sub steps:
(c1) notifying the requestor of the existence and/or details of the currently scheduled meeting; and
(c2) forwarding an invitation to the requestor to merge the requested meeting with the currently scheduled meeting.

In a second embodiment, an information manager is provided that includes:
(a) a calendar module that maintains scheduling information for meetings involving at least one subscriber;
(b) a messaging module that sends and receives electronic messages; and
(c) a meeting notification agent that:
(c1) receives a request from a requestor to identify a currently scheduled meeting matching a set of selected parameters;
(c2) determines whether a meeting matching the set of selected parameters exists;
(c3) when a meeting matching the selected set of parameters exists, determines whether selected information regarding the meeting may be disclosed to the requestor; and
(c4) when selected information regarding the meeting may be disclosed to the requestor, notifies the requestor of the selected information.

In yet another embodiment, the information manager further includes:
(d) a meeting merge agent that:
(d1) receives a request from a requestor to participate in a meeting;
(d2) determines whether a currently scheduled meeting is sufficiently similar to the meeting identified in the request; and
(d3) when a currently scheduled meeting is sufficiently similar to the identified meeting, provides a meeting merge request to the requestor and/or a participant of the currently scheduled meeting seeking permission to merge the identified meeting and the currently scheduled meeting.

The present invention can provide a number of advantages depending on the particular configuration. For example, it can identify existing and/or requested meetings. It can initiate automatically merger of substantially similar meetings. This can be particularly important for organizing meetings with multiple "popular" people, such as company directors, team leaders, sales people, and people involved in public relations. Automatically merging meetings can conserve, often scarce, resources (e.g., one room is booked for the merged meeting rather than multiple rooms at the same or different times, a single audio bridge can be used instead of two), provide increased employee efficiency (e.g., employees do not have to reconvene to discuss matters already discussed at another meeting), and provide time savings (e.g., meeting organizers do not have to find alternate, suitable times for multiple participants). It can indicate not only that a subscriber is "busy" or "available" but also indicate what meetings he or she is involved in. It readily permits users to get added to existing meetings. The present invention can offer these advantages without compromising secrecy and privacy concerns. The operations of the meeting notification and/or merge agent can be restricted such that meeting details are disclosed only to authorized persons and/or subject to disclosure restrictions imposed by meeting participants.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
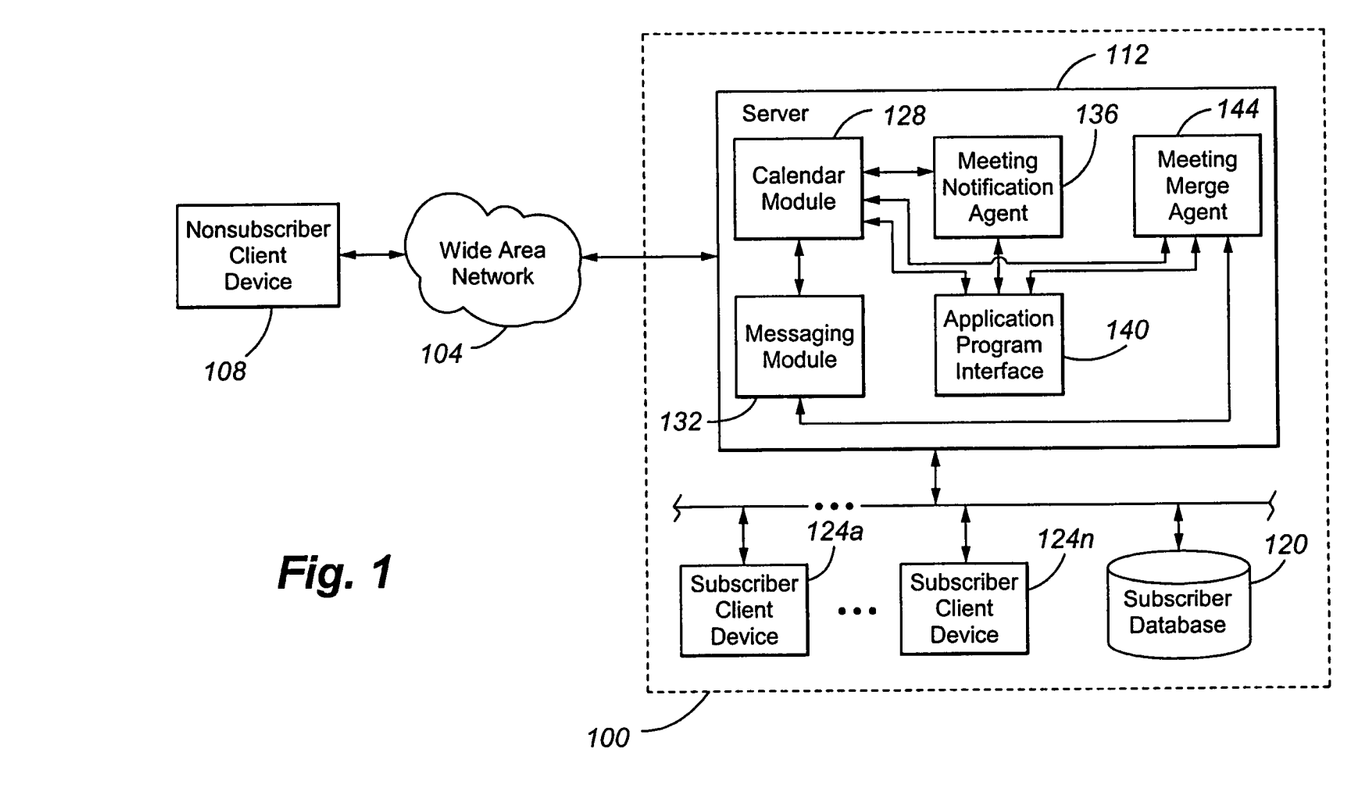
FIG. 1 is a block diagram depicting an enterprise server providing personal information management for enterprise subscribers according to an embodiment of the present invention.

FIG. 1 depicts architecture according to an embodiment of the present invention. The enterprise network 100 is in communication, via a Wide Area Network or WAN 104, with one or more nonsubscriber client devices 108. The enterprise network 100 includes a server 112 in communication, via Local Area Network 116, with a subscriber database 120 and a plurality of subscriber client devices 124a-n.

The WAN 104 and LAN 116 are commonly packet-switched networks. The WAN 104 preferably conveys packets using the TCP/IP suite of protocols, and the LAN 116 using the Ethernet protocol. As will be appreciated, other protocols may be employed depending on the application.

The client devices 108 and 124a-n can be wired or wireless. Examples of suitable client devices include a Personal Computer, a laptop, a Personal Digital Assistant, telephony endpoints and applications that support calendar functions, and the like.

The subscriber database 120 includes subscriber information, such as subscriber identities, electronic addresses, scheduling information (e.g., calendars), task lists, contact management information and preferences, shared mailboxes, public folders, and organization and areas of responsibility.

Figure 2:
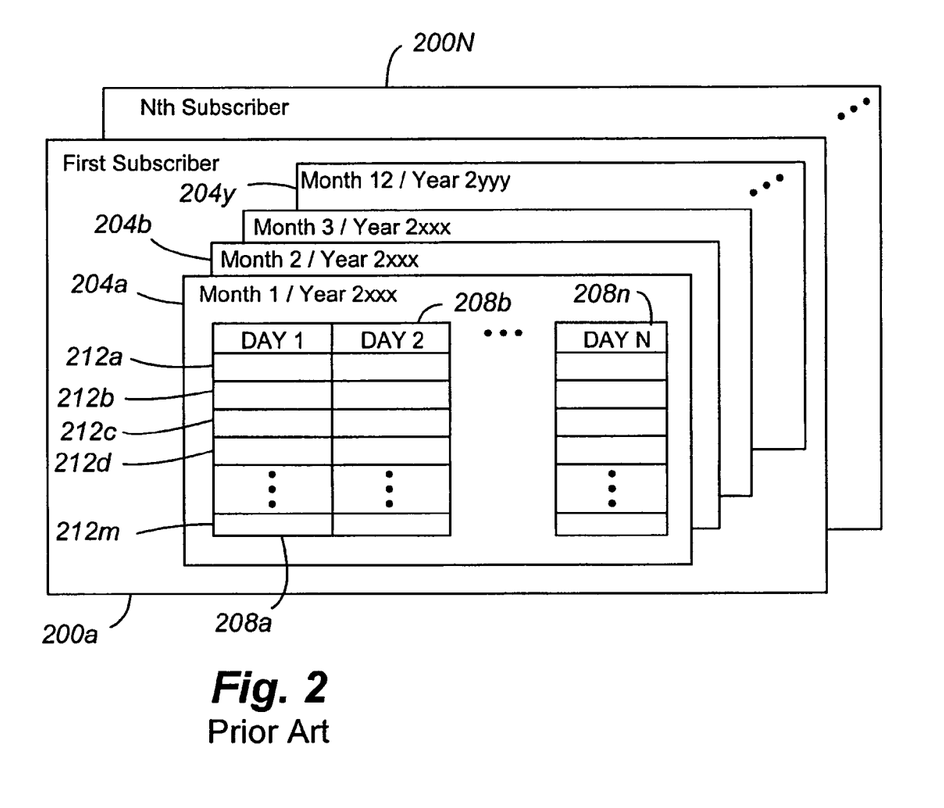
FIG. 2 is a prior art depiction of a set of personal information data structures for enterprise subscribers.

An example of a set of data structures used for scheduling information is shown in FIG. 2. The data structures include a number of sets of scheduling records 200a-n for each of the first through nth subscribers. Each set of scheduling records 200a-n includes a set of calendar files 204a-y. Each calendar file 204 corresponds to a selected month and year and includes, for each day 208a-n in the respective month and year, a series of discrete timeslots 212a-m.

Each timeslot corresponds to a discrete time period of a set length, e.g., fifteen, thirty, or sixty minutes. Each timeslot may have an associated set of parameters, such as a task to be performed, a meeting, a list of meeting participants, a subject of the meeting, an agenda for the meeting, attachments for the meeting, a duration of the meeting, contact details for the meeting (e.g., a telephone number of a meeting participant, conference bridge, and the like), and physical location. The parameters are typically referenced in the appropriate timeslot by a pointer. As will be appreciated, when the same timeslot of a number of individuals corresponds to the same meeting, the timeslots normally contain or point to identical meeting information.

Referring again to FIG. 1, the server 112 includes a number of computational modules, specifically the calendar module 128 which receives and executes scheduling requests and updates and meeting invitations from a subscriber, a messaging module 132 which receives and sends electronic messages, such as emails, and manages electronic message repositories or mailboxes and address lists, meeting notification agent 136 that receives and responds to meeting queries, meeting merge agent 144 that identifies possible meetings that can be merged and effects the merger of the meetings, and Application Program Interface or API 140 that processes Structured Query Language or SQL database queries received from the foregoing components.

The calendar and messaging modules 128 and 132 are conventional.

The meeting notification agent 136 receives from potential meeting participants, whether subscribers or nonsubscribers, and responds to requests respecting the possible existence of one or more meetings complying with stipulated search parameters. The stipulated search parameters include one or more of a set of participant identities (which may be inclusive (e.g., "a meeting in which A and B are present") and/or exclusive (e.g., "a meeting in which A and B are not present")), a time period during which eligible meetings are scheduled (e.g., days and/or time periods within a day), a subject of the meeting (e.g., "a meeting regarding item X"), one or more agenda items for the meeting (e.g., "a meeting regarding agenda item Y"), an attachment for the meeting (e.g., "a meeting in which document 'Z' will be discussed"), a duration of the meeting, and contact details for the meeting (e.g., a telephone number of a meeting participant, conference bridge number, and the like).

Any meetings satisfying the search parameters are reviewed by the agent 136, prior to disclosure of the meeting details to the requestor, to determine whether the requestor is privileged to be notified of the existence of the meeting and/or the meeting details. Alternatively or additionally, the agent 136, prior to disclosure of the meeting details to the requestor, determines whether the organizer and/or current meeting participants have designated the meeting to be restricted. In one configuration, a restricted meeting means that there are restrictions on the publication of the existence and/or details of the meeting to unauthorized or unprivileged requestors. A fully restricted or confidential meeting means that the existence of the meeting is not published to unauthorized requestors. A partially restricted meeting means that the existence of the meeting, but not selected details of the meeting, may be disclosed to unauthorized persons. If the requestor is not privileged to learn of the existence of the meeting and/or receive the meeting details or if the meeting is otherwise designated as being restricted, an appropriate response, which is often different from or a filtered version of the search results, is provided to the requestor. For example, for a restricted or confidential meeting and/or an unprivileged requestor the response could be that "no such meetings exist." Alternatively, for a partially restricted meeting and/or an unauthorized requestor the response could be that "such a meeting exists but further details cannot be provided at this time." In this manner, organizational security and subscriber privacy issues are honored.

According to one configuration, a map of what search results may be disclosed is as follows:

| Requestor Status | Restrictions/Permissions | Permitted Degree of Disclosure |
|---|---|---|
| Authorized | Open | Full Disclosure of Search Results |
| Unauthorized | Open | Same |
| Authorized | Partially Restricted | Same |
| Unauthorized | Partially Restricted | Disclosure of Existence of Meeting |
| Authorized | Fully Restricted | Same |
| Unauthorized | Fully Restricted | None |

The meeting merge agent 144 identifies potential meetings for merger and, if acceptable to the affected organizers and/or meeting participants, merges the meetings. For example, assume meeting organizer "A" schedules a meeting for a specific time and duration with a particular set of participants. Further assume a second meeting organizer "B" attempts to set a meeting at a timeslot that directly conflicts with the meeting organized by "A". The merger agent 144 performs a check of the set of participants in both meetings and, if the sets of participants for the meetings are sufficiently similar, presents "B" with an option to request a meeting merger with "A". If "B" accepts the option, a request is sent to "A" informing him or her that both A's and B's meetings are scheduled for approximately the same time with sufficiently similar meeting participants. The request sent to "A" will ask if he or she will agree to the meeting merger. If the request is accepted by "A", the meetings are merged. As will be appreciated, the agent 144 identifies, for possible merger, not only overlapping meetings but also meetings that are temporally adjacent to one another.

In one configuration, the sets of participants are deemed to be "sufficiently similar" if at least a selected percentage or number of participants are common to both sets. For example, for two meetings, each of three participants, the meetings are deemed to be sufficiently similar if at least two of the three participants are in both meetings.

In another configuration, two meetings are deemed to be "sufficiently similar" if they are temporally adjacent to one another. Two meetings are deemed to be temporally adjacent if the two meetings are scheduled to take place within a selected time interval. For example, the two meetings are deemed to be temporally adjacent when they are scheduled to occur within the same week, same day, etc.

In other configurations, meetings are deemed to be "sufficiently similar" if one or more of the timeslot parameters are shared. For example, if the two meetings have a common subject, agenda item, or attachment, they are deemed to be sufficiently similar, even if the sets of participants of the two meetings are not sufficiently similar.

Figure 3:
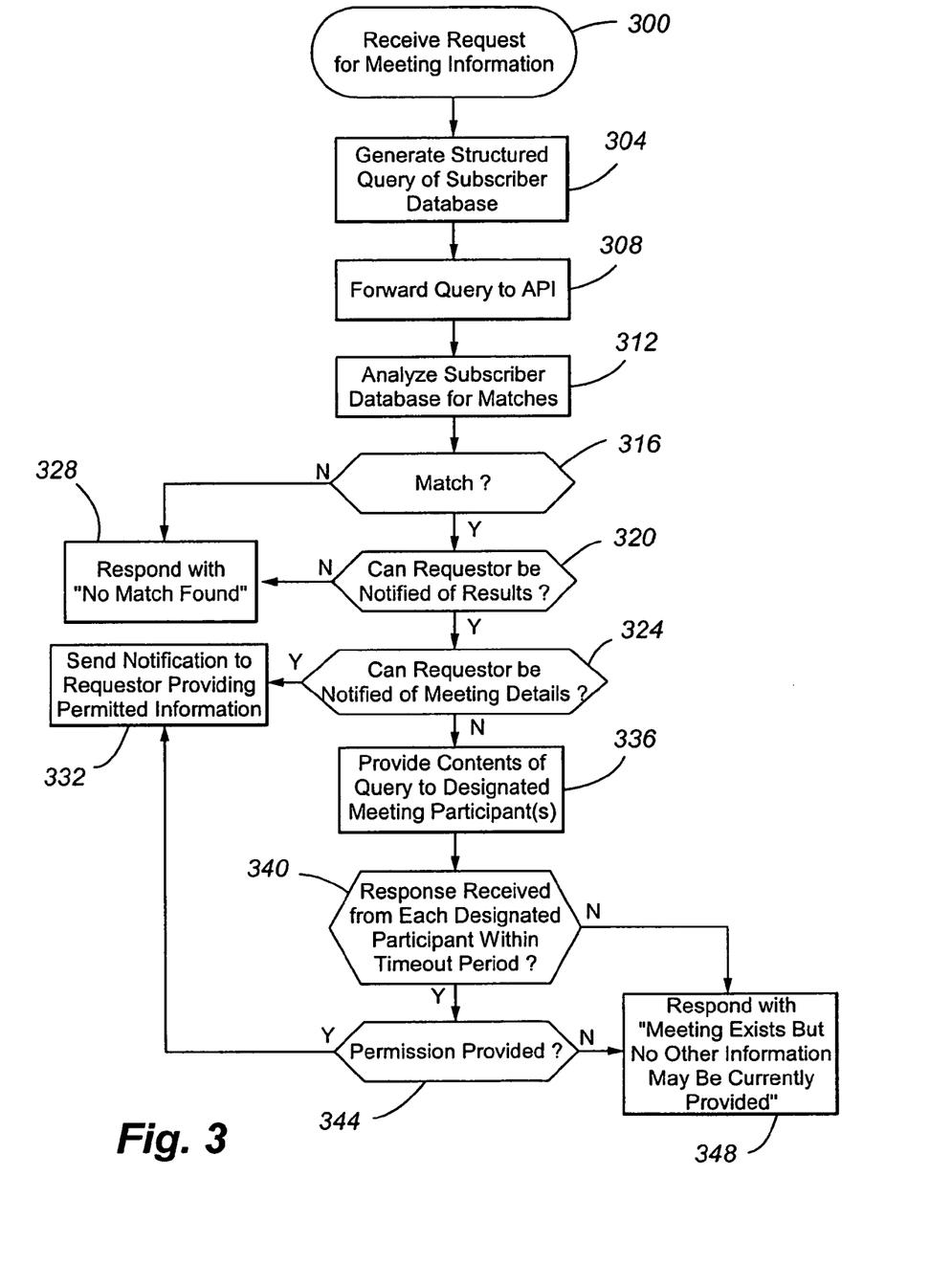
FIG. 3 is a flow chart of meeting notification agent operation according to an embodiment of the present invention.
Figure 5:
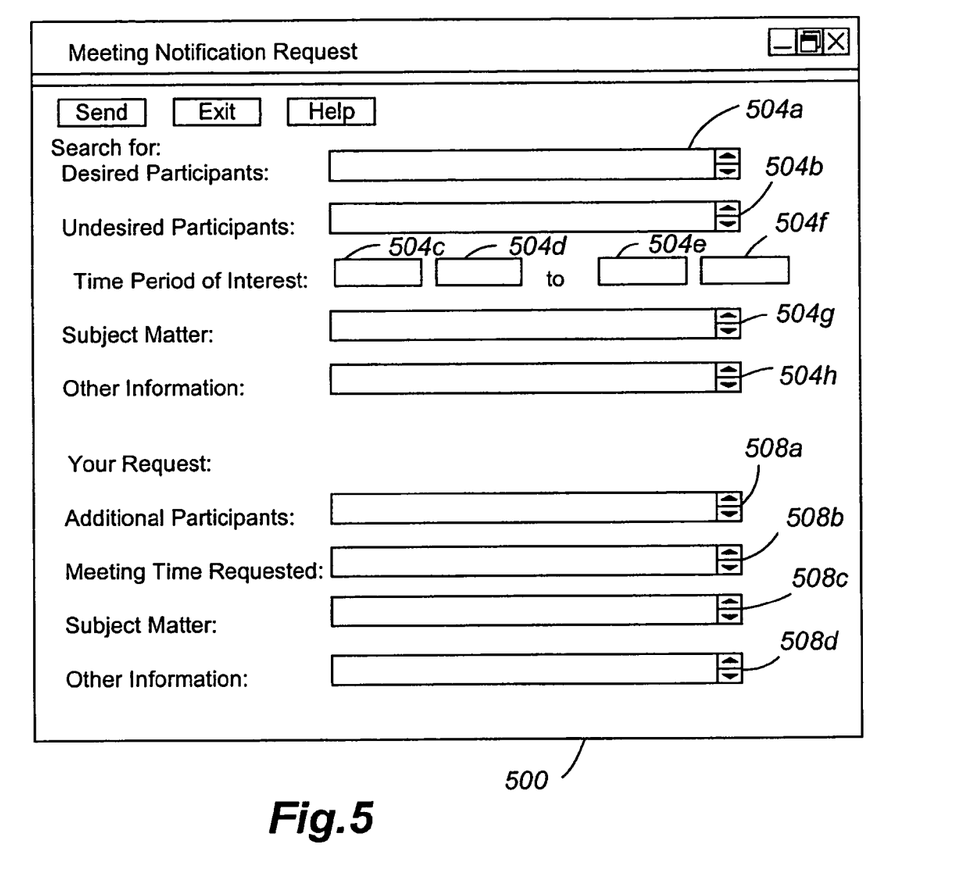
FIG. 5 is a screen shot of a search request according to an embodiment of the present invention.

The operation of the meeting notification agent 136 will now be discussed with reference to FIGS. 3 and 5.

The process starts in block 300 when a search request is received from a subscriber or nonsubscriber. An exemplary search request is shown in FIG. 5. The search request 500 includes a number of search field's 504a-h that is completed by the requestor. The search fields are a listing of the names or other identifiers of the desired meeting participants (field 504a), a listing of the names or other identifiers of the undesired (or excluded) participants (field 504b), a set of date fields 504c-f for the time period of interest in the search, a description of the subject matter to be discussed (field 504g), and a statement of other information (field 504h), such as an attachment to be discussed, a meeting room location, a conference bridge number and the like. The update field's 508a-d includes the requested changes to the existing meeting if located. The update fields 508a-d include a listing of the names or other identifiers of the additional participants (field 508a), the amount of meeting time required by the additional participants (field 508b), the subject matter to be discussed with the additional participants (field 508c), and other information of interest to one or more of the current participants of the existing meeting (field 508d). The other information may include, for example, a statement of the importance for the meeting update or other reasons why the requested meeting change needs to be effected.

In step 304, the agent 136 generates, from the request, a structured query for the database 120 and, in step 308, forwards the query to the API 140.

In step 312, the API performs the search of the database 120 to locate any meeting(s) satisfying the information inputted into the search fields and returns a response to the agent 136.

In decision diamond 316, the agent 136 determines whether or not a match was found. If not, the agent 136, in step 328, notifies the requestor that no match was found. If a match was found, the agent 136 proceeds to decision diamond 320.

In decision diamond 320, the agent 136 determines whether the requestor can be notified of the results. As noted, this decision diamond can be based on the authority level of the requestor and/or the stipulated level of restrictions/permissions attached to the meeting by the organizer. In one configuration, the decision is based on a combination of the two criteria in accordance with the mapping table above. For example, even though the meeting is designated as being confidential by the organizer, the existence and/or details of the meeting may still be provided to the requestor if the requestor is a supervisor of the meeting participants. To establish that the requestor has the requisite authority, the requestor can be subjected to an authentication procedure in which the requestor is asked to provide a password before the meeting details will be provided.

If the requestor is not entitled to be notified of the search results, the agent 136 proceeds to step 328. The requestor receives no feedback from the agent 136 that hints at the existence of a matching meeting. In one configuration, the update fields 508a-d are forwarded to the organizer and/or selected participants of the matching meeting so that they are aware of the request and can contact the requestor independently of the agent 136.

If the requestor is entitled to be notified of the search results, the agent 136, in decision diamond 324, determines the level of meeting details that may be provided to the requestor. As in the case of decision diamond 320, this determination can be based on the authority level of the requestor and/or the stipulated level of restriction attached to the meeting by the organizer.

When the requestor is authorized to receive the details of the meeting or when the meeting is open (i.e., not designated as being at least partially restricted), the agent 136, in step 332, provides a notification to the requestor providing the permitted meeting information. This information typically includes the list of meeting participants, the meeting location, the meeting time and duration, and the meeting subject matter. In one configuration, the agent 136 forwards the update fields 508a-d to the matching meeting organizer and/or selected participants of the matching meeting giving them an opportunity to agree to the proposed meeting modification. The organizer and/or selected participants could respond, "yes" to accept the modifications or "no" to refuse the modifications. A refusal may or may not be accompanied by an explanation, such as "adding you to the agenda would be inappropriate because people unrelated to Project X will be attending."

When the requestor is not authorized to receive the details of the meeting and the meeting is designated as being at least partially restricted, the agent 136, in step 336, provides an invitation, containing the contents of the update fields 508a-d, to one or more selected participants of the meeting, which matched the query. The selected participants generally include the meeting organizer.

In decision diamond 340, the agent 136 determines whether a response has been received from each of the selected participants within a timeout period. If not, the agent proceeds to step 348 and notifies the requestor that a meeting exists but no other information may be currently provided. The requestor may contact independently one or more of the participants in an attempt to be included within the meeting.

If a response is received from each of the selected participants within the timeout period, the agent 136 proceeds to decision diamond 344 and determines whether each of the selected participants accepted the invitation, or indicated that the meeting may be updated as requested in the update fields. If not, the agent 136 proceeds to step 348. If so, the agent 136 proceeds to step 332 and provides the requestor and current meeting participants with a copy of the acceptance of the invitation and the updated meeting details.

Where multiple matches are found, the agent 136 may notify the requestor, if permitted, of each of the matches or may notify the requestor of only the meeting that is the "best" match. Predefined rules may define which of a number of matching meetings is the "best match." In one configuration, an interactive session with the requestor is conducted after the search is performed to filter the various matches down to the best match. In the session, the user is asked for additional details that would be desired in a match. The additional details may also be requested before the search is performed.

Figure 4:
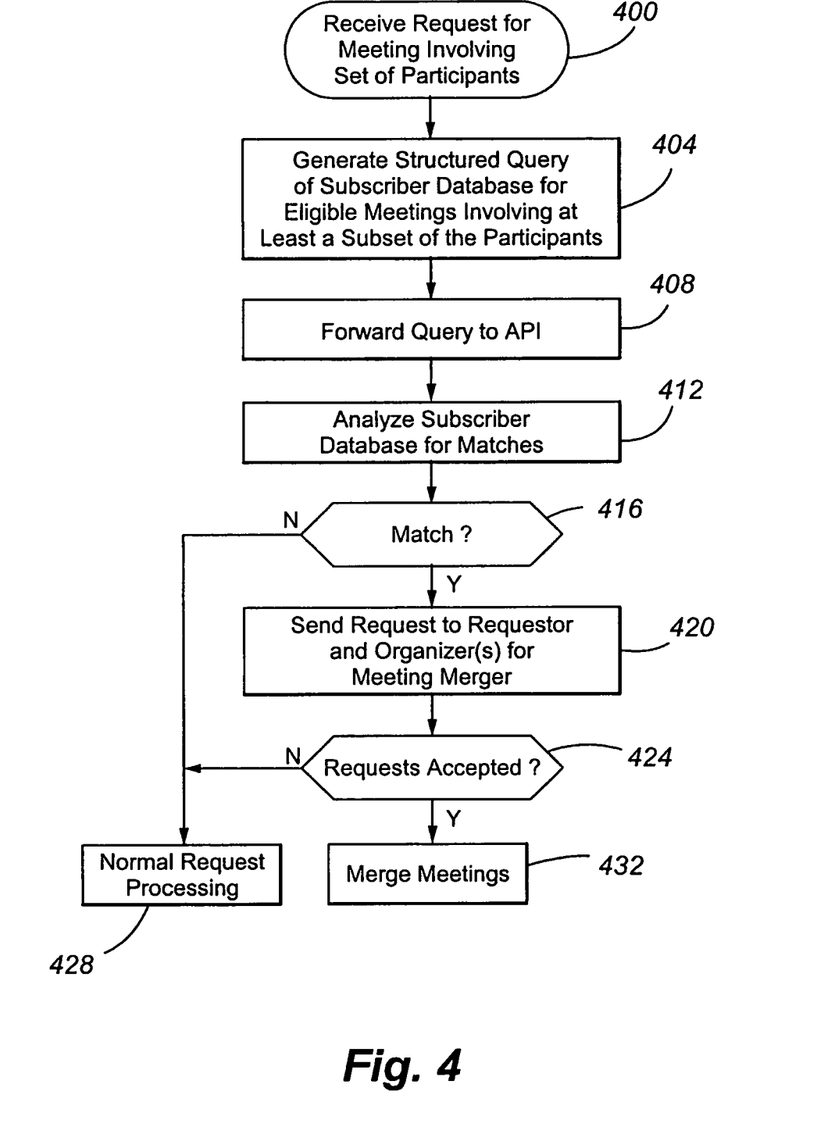
FIG. 4 is a flow chart of meeting merger agent operation according to an embodiment of the present invention.
Figure 6:
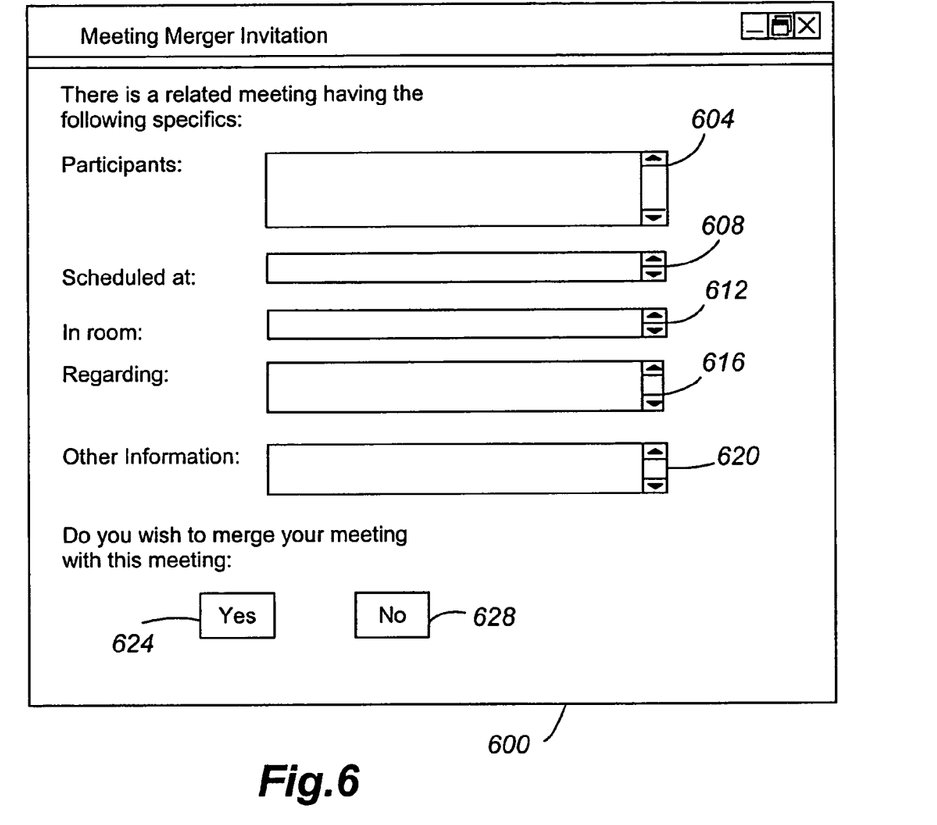
FIG. 6 is a screen shot of a meeting merger invitation according to an embodiment of the present invention.

The operation of the meeting merge agent 144 will now be discussed with reference to FIGS. 4 and 6.

The process starts in block 400 when the agent 144 receives a request to schedule a meeting involving a set of participants and all or some of the timeslot meeting fields noted above.

The agent 144 automatically generates a structured query of the subscriber database 120 using, in the search fields, a subset of the meeting information received in the request. The subset of information is defined in a set of rules defining what degree of similarity is needed for the requested meeting and an existing meeting to be "sufficiently similar." In other words, matching meetings must be meetings that are sufficiently similar to the requested meeting, and the query contains the minimum information required for the requested meeting and another meeting to be "sufficiently similar." For example, the query may require only two of the three meeting participants to be present, the meeting to be on-site, and the meeting to be scheduled within three days of the requested meeting.

The agent 144 forwards the structured query to the API 140 in step 412.

In step 412, the API 140 executes the search set forth in the query and provides a response to the agent 144.

In decision diamond 416, the agent 144 determines whether any matching meetings were identified. When no matching meetings are identified, the agent 144 proceeds to step 428 and processes the meeting scheduling request or invitation in the normal manner. When a match is found, the agent 144 proceeds to step 420.

In step 420, the agent 144 sends a meeting merge request first to the requestor and then to the existing meeting organizer to approve the proposed merger. An exemplary merger invitation is shown in FIG. 6. The invitation 600 includes fields for the list of participants in the matching meeting (field 604), the scheduled time and duration of the matching meeting (field 608), the matching meeting location (field 612), the subject matter of the matching meeting (field 616) (which may include an agenda and/or attachment), and other information regarding the matching meeting (field 620). The "other information" may include a statement by the agent 144 of why the meeting is deemed to be sufficiently similar to the requested meeting. A "YES" icon 624 and "NO" icon 628 provide the recipient with the option of accepting or declining, respectively, the merger invitation.

In decision diamond 424, the merger agent determines whether both the requestor and matching meeting organizer have accepted the invitation to merge the meetings. If not, the agent 144 performs normal processing of the meeting request in step 428. If the invitation is accepted by both parties, the agent 144 sets up a merged meeting in step 432.

The merged meeting, when accepted by both parties, is set up according to predetermined rules. Exemplary rules include:
(i) the merged meeting start time is the earliest start time of the meetings to be merged;
(ii) the merged meeting duration is calculated by adding the duration of all of the meetings to be merged;
(iii) the meeting resources are booked for the duration of the merged meetings;
(iv) meeting updates are sent to all participants in the merged meetings notifying them of the merger;
(v) those who are not participants of the meeting(s), before they were merged, are notified that they may not be required for the entire meeting; and
(vi) the merged meeting appears as a large meeting with the various separate agendas of the component meetings.

In one configuration, the proposed merged meeting details (e.g., start time, duration, location, participants, and subject matter) are provided to the requestor in the merger invitation 600. The requestor may edit the proposed merged meeting details before, or as a condition of, acceptance. The revised, proposed merged meeting details are then provided in a second merger invitation 600 to the organizer of the matching meeting. The organizer can further revise the merged meeting details before acceptance. A further invitation is then sent to the requestor indicating the further revised merged meeting details. The process is continued until the requestor and organizer have agreed on the revised meeting details.

As will be evident from the above discussion, more than two meetings may be merged depending on the application.

A number of variations and modifications of the invention can be used. It would be possible to provide for some features of the invention without providing others.

For example in one alternative embodiment, subscribers only and not nonsubscribers can perform searches for other subscribers' meetings and agree to meeting mergers.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) receiving a request, at a server, from a requestor to participate in a meeting with one or more of a specified plurality of participants about a selected matter, the requestor being a person;
   (b) determining, based on a comparison to one or more other scheduled meetings, that a meeting is currently scheduled for the one or more of the specified plurality of participants and that a currently scheduled meeting is for the selected matter based on one or more of a common subject, agenda item, or attachment, wherein the comparison is based on a structured query of a subscriber database using, in one or more search fields, a subset of meeting information received in the request, the subset of meeting information being defined in a set of rules that define what degree of similarity is needed between the selected matter and the one or more other scheduled meetings; and
   (c) before performing a meeting merger step, performing, by the server, one or more of the following steps:
      (c1) notifying the requestor of at least one of the existence and details of the currently scheduled meeting, wherein notification of the requestor of the at least one of the existence and details depends on one or more of
         (i) an authority level of the requestor, wherein an authentication procedure is executed in which the requestor is asked to provide a password before the requestor is notified of the at least one of the existence and details of the currently scheduled meeting, and
         (ii) a stipulated level of restriction by a meeting organizer; and
      (c2) forwarding a meeting merger invitation to the requestor to merge the requested meeting with the currently scheduled meeting, wherein the invitation is a graphical user interface presented to the requestor which includes a participant field, a scheduled at field, a location field, subject matter of matching meeting information, other information regarding the matching meeting information and user selectable icons for approving or rejecting the meeting merger invitation;
   (d) receiving, from the requestor and the one or more of the plurality of participants, indications approving a meeting merger between the requested meeting and the currently scheduled meeting; and
   (e) merging, by the server, based on the approving indications, the requested meeting and the currently scheduled meeting resulting in a merged meeting.

2. The method of claim 1, wherein step (c1) is performed and further comprising:
   (f) determining that the currently scheduled meeting is at least partially restricted and wherein step (c1) comprises the sub steps of:
   determining that the currently scheduled meeting is at least partially restricted, and notifying the requestor of the existence of the currently scheduled meeting but not details regarding the meeting.

3. The method of claim 2, wherein step (c1) comprises the sub steps of:
   determining that the currently scheduled meeting is fully restricted, and not notifying the requestor of the existence of the currently scheduled meeting.

4. The method of claim 2, wherein step (c1) comprises the sub steps of:
   determining that the currently scheduled meeting is open, and notifying the requestor of the existence and details of the currently scheduled meeting.

5. The method of claim 1, wherein step (c1) is performed, wherein the currently scheduled meeting is at least partially restricted, and further comprising:
   (a) determining whether the requestor is authorized to receive the meeting notification; and wherein step (c1) comprises the sub steps of:
   when the requester is authorized to receive the meeting notification, performing step (c1); and
   when the requester is unauthorized to receive the meeting notification, not performing step (c1).

6. The method of claim 1, wherein step (c1) is performed and further comprising:
   (b) determining that the currently scheduled meeting is at least partially restricted
   and notifying at least some of the participants of the currently scheduled meeting of the request seeking permission to provide to the requestor meeting information, which the requestor is otherwise not entitled to receive.

7. The method of claim 1, wherein step (c2) is performed and further comprising:
   determining that the currently scheduled meeting and requested meeting are substantially similar, wherein step (c2) is performed when the meetings are substantially similar based on the rules that define a degree of similarity needed to match the currently scheduled meeting and the requested meeting.

8. An information manager, comprising:
   a server, wherein the server includes:
   (a) a calendar module operable to maintain scheduling information for meetings involving at least one subscriber;
   (b) a messaging module operable to send and receive electronic messages; and
   (c) a meeting notification agent operable to:
      (c1) receive a request from a requestor, the requestor being a person, to identify a currently scheduled meeting matching a set of selected parameters;
      (c2) determine, based on a comparison to one or more other scheduled meetings, that a meeting matching the set of selected parameters exists wherein the matching matches one or more participants and one or more of a common subject, agenda item or attachment, wherein the matching is based on a structured query of a subscriber database using, in one or more search fields, a subset of meeting information received in the request, the subset of meeting information being defined in a set of rules that define what degree of similarity is needed between the set of selected parameters and the one or more other scheduled meetings;
      (c3) determine that selected information regarding the matching meeting may be disclosed to the requestor, wherein the determination (c3) is based on one or more of (i) an authority level of the requestor, wherein an authentication procedure is executed in which the requestor is asked to provide a password before the meeting details will be disclosed to the requestor, and (ii) a stipulated level of restriction by a meeting organizer; and
      (c4) before the merger agent performs a step of merging meetings, notifying the requestor of the selected information;
   (d) a merger agent that cooperates with the processor, the merger agent receives, from the requestor and one or more of a plurality of participants, indications approving a meeting merger between a requested meeting and the currently scheduled meeting and the processor merges, based on the approving indications, the requested meeting and the currently scheduled meeting resulting in a merged meeting.

9. The manager of claim 8, wherein the set of selected parameters comprises at least one of a set of participant identities, a time period during which eligible meetings are scheduled, a subject of the meeting, one or more agenda items for the meeting, an attachment for the meeting, a duration of the meeting, contact details for the meeting, and physical location.

10. The manager of claim 8, wherein operation (c3) comprises the sub-operation of determining that disclosure of information regarding the matching meeting has been restricted by at least one of the participants of the matching meeting.

11. The manager of claim 8, wherein operation (c3) comprises the sub-operation of determining that the requestor is authorized to receive information regarding the matching meeting.

12. The manager of claim 8, wherein the request comprises a set of search fields corresponding to the set of selected parameters and a set of update fields providing desired changes to any matching meeting.

13. The manager of claim 8, wherein, determining that the matching meeting is partially restricted, and disclosing to the requestor the selected information comprising the existence of the meeting but excluding at least a plurality of the set of matching meeting participants, the scheduled time for the matching meeting, the subject matter of the matching meeting, and the location of the matching meeting.

14. The manager of claim 8, wherein, determining that the matching meeting is fully restricted and not disclosing the selected information to a requestor.

15. An information manager, comprising:
   a server, wherein the server includes:
   (a) a calendar module, associated with a server, operable to maintain scheduling information for meetings involving at least one subscriber;
   (b) a messaging module operable to send and receive electronic messages; and
   (c) a meeting merge agent running on the server that is operable to:
      (c1) receive a request from a requestor, the requestor being a person, to participate in a meeting about a selected matter;
      (c2) determine, based on a comparison to one or more other scheduled meetings, that a currently scheduled meeting is sufficiently similar to the meeting identified in the request based on matching one or more participants and the selected matter based on one or more of a common subject, agenda item, or attachment, wherein the comparison is based on a structured query of a subscriber database using, in one or more search fields, a subset of meeting information received in the request, the subset of information being defined in a set of rules that define what degree of similarity is sufficient to match the selected matter and the one or more other scheduled meetings; and
      (c3) before merging meetings, providing a meeting merge request to at least one of the requestor and a participant of the currently scheduled meeting seeking permission to merge the identified meeting and the currently scheduled meeting, wherein the meeting merge request is a graphical user interface which includes a participant field, a scheduled at field, a location field, subject matter of the matching meeting information, other information regarding the matching meeting information and user selectable icons for approving or rejecting the meeting merge request;

(c4) receive, from the requestor and one or more participants, indications approving a meeting merger between the requested meeting and the currently scheduled meeting; and (c5) merge, by the meeting merge agent, based on the approving indications, the requested meeting and the currently scheduled meeting resulting in a merged meeting.

16. The manager of claim 15, wherein the merge agent is operable to form a subset of the meeting information contained in the request, the subset defining when a currently scheduled meeting is substantially similar to the identified meeting based on a set of rules that define what degree of similarity is sufficient to match the selected matter and the one or more other scheduled meetings, and is used to search for a currently scheduled meeting.

17. The manager of claim 15, wherein, when the meetings are merged, at least one of the following is true: a start time for the merged meeting is a start time of at least one of the currently scheduled and identified meetings, a duration of the merged meeting is a sum of durations of the currently scheduled and identified meetings, a set of participants of the merged meeting comprises participants of the currently scheduled and identified meetings, and an agenda for the merged meeting comprises items in agendas for the currently scheduled and identified meetings.

18. The manager of claim 15, further comprising:

(d) a meeting notification agent operable to:
  (d1) receive a second request from a second requestor to identify a currently scheduled meeting matching a set of selected search parameters;
  (d2) determining that a meeting matching the set of selected search parameters exists based on the currently scheduled meeting matching the set of selected search parameters;
  (d3) determining that selected information regarding the meeting may be disclosed to the second requestor; and
  (d4) notifying the second requestor of the selected information.

* * * * *

UNITED STATES PATENT AND TRADEMARK OFFICE
CERTIFICATE OF CORRECTION

| | | |
|---|---|---|
| PATENT NO. | : 8,600,794 B2 | Page 1 of 1 |
| APPLICATION NO. | : 11/396175 | |
| DATED | : December 3, 2013 | |
| INVENTOR(S) | : Colin Blair et al. | |

It is certified that error appears in the above-identified patent and that said Letters Patent is hereby corrected as shown below:

In the Claims:

Column 11, lines 7 and 9, please delete "requester" and insert --requestor--.

Signed and Sealed this
Twenty-fourth Day of June, 2014

Michelle K. Lee
*Deputy Director of the United States Patent and Trademark Office*